United States Patent
White et al.

(10) Patent No.: US 8,078,469 B2
(45) Date of Patent: *Dec. 13, 2011

(54) DISTRIBUTED VOICE USER INTERFACE

(76) Inventors: George M. White, Delray Beach, FL (US); James J. Buteau, Mountain View, CA (US); Glen E. Shires, Danville, CA (US); Kevin J. Surace, Sunnyvale, CA (US); Steven Markman, Los Gatos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/057,523

(22) Filed: Jan. 22, 2002

(65) Prior Publication Data

US 2002/0072918 A1   Jun. 13, 2002

Related U.S. Application Data

(62) Division of application No. 09/290,508, filed on Apr. 12, 1999, now Pat. No. 6,408,272.

(51) Int. Cl.
*G10L 15/00* (2006.01)
*G10L 15/22* (2006.01)

(52) U.S. Cl. ........... 704/270.1; 704/270; 704/275

(58) Field of Classification Search ......... 704/251, 704/252, 258, 270, 270.1, 275, 243, 244, 704/250, 255; 379/88.01, 88.16
See application file for complete search history.

(56) References Cited

U.S. PATENT DOCUMENTS

| | | |
|---|---|---|
| 4,525,793 A | 6/1985 | Stackhouse |
| 4,653,100 A | 3/1987 | Barnett et al. |
| 4,716,583 A | 12/1987 | Groner et al. |
| 4,731,811 A | 3/1988 | Dubus |
| 4,785,408 A | 11/1988 | Britton et al. |
| 4,974,254 A | 11/1990 | Perine et al. |
| 5,001,745 A | 3/1991 | Pollock |
| 5,086,385 A * | 2/1992 | Launey et al. .............. 700/83 |
| 5,136,634 A | 8/1992 | Rae et al. |
| 5,351,276 A | 9/1994 | Doll, Jr. et al. |
| 5,367,454 A | 11/1994 | Kawamoto et al. |
| 5,493,606 A | 2/1996 | Osder et al. |
| 5,500,920 A | 3/1996 | Kupiec |
| 5,515,296 A * | 5/1996 | Agarwal .............. 709/204 |
| 5,546,584 A | 8/1996 | Lundin et al. |
| 5,559,927 A | 9/1996 | Clynes |

(Continued)

FOREIGN PATENT DOCUMENTS

EP    0 697780 A2    2/1996

(Continued)

OTHER PUBLICATIONS www.generalmagic.com/products/enterprise_ds.pdf; "magicTalk Enterprise Platform," Printed Dec. 12, 2001; Posted in Jun. 2001; 2 pages.

(Continued)

*Primary Examiner* — Martin Lerner
(74) *Attorney, Agent, or Firm* — Sterne, Kessler, Goldstein & Fox PLLC

(57) ABSTRACT

A distributed voice user interface system includes a local device which receives speech input issued from a user. Such speech input may specify a command or a request by the user. The local device performs preliminary processing of the speech input and determines whether it is able to respond to the command or request by itself. If not, the local device initiates communication with a remote system for further processing of the speech input.

25 Claims, 5 Drawing Sheets

U.S. PATENT DOCUMENTS

| | | | | |
|---|---|---|---|---|
| 5,592,588 | A * | 1/1997 | Reekes et al. | 704/278 |
| 5,608,786 | A | 3/1997 | Gordon | |
| 5,614,940 | A | 3/1997 | Cobbley et al. | |
| 5,631,948 | A | 5/1997 | Bartholomew et al. | |
| 5,636,325 | A | 6/1997 | Farrett | |
| 5,651,056 | A | 7/1997 | Eting et al. | |
| 5,694,558 | A | 12/1997 | Sparks et al. | |
| 5,721,827 | A | 2/1998 | Logan et al. | |
| 5,727,950 | A | 3/1998 | Cook et al. | |
| 5,732,187 | A * | 3/1998 | Scruggs et al. | 704/251 |
| 5,752,232 | A * | 5/1998 | Basore et al. | 704/275 |
| 5,774,859 | A * | 6/1998 | Houser et al. | 704/275 |
| 5,796,729 | A * | 8/1998 | Greaney et al. | 370/345 |
| 5,812,977 | A | 9/1998 | Douglas | |
| 5,819,220 | A | 10/1998 | Sarukkai et al. | |
| 5,860,064 | A | 1/1999 | Henton | |
| 5,873,057 | A | 2/1999 | Eves et al. | |
| 5,890,123 | A | 3/1999 | Brown et al. | |
| 5,899,975 | A | 5/1999 | Nielsen | |
| 5,905,773 | A * | 5/1999 | Wong | 379/88.03 |
| 5,913,195 | A | 6/1999 | Weeren et al. | |
| 5,915,001 | A * | 6/1999 | Uppaluru | 379/88.22 |
| 5,915,238 | A * | 6/1999 | Tjaden | 704/260 |
| 5,918,213 | A | 6/1999 | Bernard et al. | |
| 5,926,789 | A | 7/1999 | Barbara et al. | |
| 5,929,748 | A * | 7/1999 | Odinak | 340/310.11 |
| 5,930,752 | A * | 7/1999 | Kawaguchi et al. | 704/270.1 |
| 5,943,648 | A * | 8/1999 | Tel | 704/270.1 |
| 5,946,050 | A | 8/1999 | Wolff | |
| 5,946,658 | A * | 8/1999 | Miyazawa et al. | 704/275 |
| 5,953,392 | A * | 9/1999 | Rhie et al. | 239/588 |
| 5,953,700 | A * | 9/1999 | Kanevsky et al. | 704/270.1 |
| 5,956,683 | A * | 9/1999 | Jacobs et al. | 704/201 |
| 5,960,399 | A * | 9/1999 | Barclay et al. | 370/349 |
| 5,963,618 | A * | 10/1999 | Porter | 379/88.18 |
| 5,987,415 | A | 11/1999 | Breese et al. | |
| 6,017,219 | A | 1/2000 | Adams et al. | |
| 6,035,275 | A | 3/2000 | Brode et al. | |
| 6,049,604 | A * | 4/2000 | Lin | 379/355.08 |
| 6,055,513 | A | 4/2000 | Katz et al. | |
| 6,055,566 | A * | 4/2000 | Kikinis | 709/218 |
| 6,058,166 | A | 5/2000 | Osder et al. | |
| 6,061,651 | A * | 5/2000 | Nguyen | 704/233 |
| 6,078,886 | A | 6/2000 | Dragosh et al. | |
| 6,098,041 | A * | 8/2000 | Matsumoto | 704/260 |
| 6,098,043 | A | 8/2000 | Forest et al. | |
| 6,101,473 | A | 8/2000 | Scott et al. | |
| 6,122,614 | A * | 9/2000 | Kahn et al. | 704/235 |
| 6,144,402 | A * | 11/2000 | Norsworthy et al. | 725/109 |
| 6,144,938 | A | 11/2000 | Surace et al. | |
| 6,163,768 | A * | 12/2000 | Sherwood et al. | 704/235 |
| 6,173,266 | B1 | 1/2001 | Marx et al. | |
| 6,182,038 | B1 * | 1/2001 | Balakrishnan et al. | 704/250 |
| 6,185,535 | B1 | 2/2001 | Hedin et al. | |
| 6,208,666 | B1 * | 3/2001 | Lawrence et al. | 370/503 |
| 6,233,559 | B1 * | 5/2001 | Balakrishnan | 704/270.1 |
| 6,246,981 | B1 | 6/2001 | Papineni et al. | |
| 6,272,463 | B1 * | 8/2001 | Lapere | 704/248 |
| 6,282,268 | B1 * | 8/2001 | Hughes et al. | 379/88.03 |
| 6,282,511 | B1 * | 8/2001 | Mayer | 704/270 |
| 6,301,603 | B1 * | 10/2001 | Maher et al. | 718/105 |
| 6,314,402 | B1 | 11/2001 | Monaco et al. | |
| 6,321,198 | B1 | 11/2001 | Hank et al. | |
| 6,327,568 | B1 * | 12/2001 | Joost | 704/251 |
| 6,349,290 | B1 | 2/2002 | Horowitz et al. | |
| 6,363,348 | B1 * | 3/2002 | Besling et al. | 704/270.1 |
| 6,366,650 | B1 | 4/2002 | Rhie et al. | |
| 6,385,583 | B1 | 5/2002 | Ladd et al. | |
| 6,385,584 | B1 | 5/2002 | McAllister et al. | |
| 6,397,187 | B1 * | 5/2002 | Vriens et al. | 704/275 |
| 6,400,806 | B1 | 6/2002 | Uppaluru | |
| 6,408,272 | B1 * | 6/2002 | White et al. | 704/270.1 |
| 6,418,216 | B1 * | 7/2002 | Harrison et al. | 379/208.01 |
| 6,418,440 | B1 | 7/2002 | Kuo et al. | |
| 6,434,520 | B1 | 8/2002 | Kanevsky et al. | |
| 6,510,411 | B1 | 1/2003 | Norton et al. | |
| 6,526,382 | B1 | 2/2003 | Yuschik | |
| 6,539,359 | B1 | 3/2003 | Ladd et al. | |
| 6,578,000 | B1 | 6/2003 | Dodrill et al. | |
| 6,606,280 | B1 * | 8/2003 | Knittel | 367/198 |
| 6,718,015 | B1 * | 4/2004 | Berstis | 379/88.17 |
| 6,823,225 | B1 | 11/2004 | Sass | |
| 6,965,863 | B1 | 11/2005 | Zuberec et al. | |
| 7,266,499 | B2 * | 9/2007 | Surace et al. | 704/270 |
| 7,769,591 | B2 * | 8/2010 | White et al. | 704/270 |
| 2001/0013001 | A1 * | 8/2001 | Brown et al. | 704/270.1 |
| 2002/0072905 | A1 | 6/2002 | White et al. | |
| 2002/0164000 | A1 | 11/2002 | Cohen et al. | |
| 2002/0198719 | A1 | 12/2002 | Gergic et al. | |
| 2005/0091057 | A1 | 4/2005 | Phillips et al. | |
| 2005/0261907 | A1 | 11/2005 | Smolenski et al. | |
| 2006/0287854 | A1 | 12/2006 | Smolenski et al. | |
| 2006/0293897 | A1 | 12/2006 | White et al. | |

FOREIGN PATENT DOCUMENTS

| | | |
|---|---|---|
| WO | WO 96/11542 A1 | 4/1996 |
| WO | WO 97/33416 A1 | 9/1997 |
| WO | WO 02/093554 A1 | 11/2002 |

OTHER PUBLICATIONS www.generalmagic.com/products/entetprise_platform.shtrn1; "magicTalk Enterprise Platform," Printed Dec. 12, 2001; Posted in Jun. 2001; 2 pages.

Hanrieder, G., "Integration Of A Mixed-Initiative Dialogue Manager Into Commercial IVR Platforms," *Proceedings of the 1998 IEEE 4th Workshop on Interactive Voice Technology for Telecommunications Applications*, pp. 77-82 (Sep. 29-30, 1998).

"magicTalk Voice Application Development Platform," from http://www.generalmagic.com/voice/platform.shtml, 3 pages (printed on May 14, 2001).

"Nuance Speech Objects™", from http://www.nuance.cotn/products/speechobjects.html, 3 pages (printed on May 14, 2001).

"SpeechObjects™ & VoiceXML," White Paper, Nuance Communications, Inc., from http://www.nuance.com/pdf/SpeechObiectsVoiceXMLWP.pdf, 14 pages (2000).

"SpeechObjects: An Architectural Overview," White Paper, Nuance Communications, Inc., from http://www.nuance.com/SpeechObiects_whitepaper050100mm.pdf, 16 pages (printed on May 14, 2001).

"Voice Gateway," from http://www.generalmagic.com/voice/gateway.shtml, 4 pages (printed on May 14, 2001).

Asthana, A. and Krzyzanowski, P., "A Small Domain Communications System for Personalized Shopping Assistance," *Personal Wireless Communications, IEEE International Conference*, pp. 199-203, Aug. 1994.

Chin, John P., "Personality Trait Attributions to Voice Mail User Interfaces", Proceedings of the 1996 Conference on Human Factors in Computing Systems, CHI 96, Online! Apr. 13-18, 1996, pp. 248-249, XP002113878 Vancouver, BC, CA; retrieved from the Internet on 1999-09-96.

Method for Appropriately Interfacing to User Characteristics in a Voice Interface System, IBM Technical Disclosure Bulletin, vol. 37, No. 3, pp. 307-308, XP000441484, New York, Mar. 1994.

Database Inspec 'Online' Institute of Electrical Engineers, Stevenage, GB, Trainer et al.: "The inclusion of personality trait based adaptive interfaces into computer based learning and training environments," Database accession No. 5193879 XP992113879, Abstract and Proceedings of the Thirty-First International Matador Conference, Apr. 20-21, 1995, pp. 195-200, Manchester, UKISBN: 0-333-64086-1.

Makoto, "TNG PhoneShell (part 2). A proposal and an implementation of internet access method with telephones and facsimiles," Joho Shori Gakkai Kenkyu Hokoku, May 1995, vol. 95, No. 115, pp. 7-12.

PwWebSpeak Overview [online]. The Productivity Works, Sep. 4, 1996, [retrieved on Apr. 15, 1997]. Retrieved on the Internet <URL:http://www.prodworks.com/pwwwovw.htm<.*.

"New Product Makes the Internet World Wide Web Usable by the Visually Impaired", pwWebSpeak Press Release, Feb. 12, 1996.

Hakkinen et al., "pwWebSpeak: User Interface Design of an Accessible Web Browser". Mar. 1998.

"'WebSpeak' opens cyberspace to visually impaired," The Times, Trenton, NJ, 3 pages (Feb. 12, 1996).

Christodoulakis et al. "The Multimedia Object Presentation Manager of MINOS: A symmetric approach," SIGMOD, vol. 15, No. 2, pp. 295-310, Jun. 1986.

Zue, "Navigating the Information Superhighway Using Spoken Language Interfaces", IEEE Expert, Oct. 1995, pp. 39-43.

Caldwell et al., "Project Echo—Telephonic Browser for the WWW," <http://www.cc.gatech.edu/people/home/tgay/echo.html> Apr. 15, 1997.

James, "Presenting HTML Structure in Audio: User Satisfaction with Audio Hypertext," <http://www-pcd.stanford.edu/~fjames/reports/pilor-tr/techrep-pilot.html> Apr. 14, 1997.

James, "AHA: Audio HTML Access" <http://www-pcd.stanford.edu/~fjames/aha/www6/PAPER296.html> Apr. 14, 1997.

Novick, et al., "A multimodal browser for the World-Wide Web". (1995).

House, "Spoken-language Access to Multimedia (SLAM)," Master's Thesis, Oregon Graduate Institute. (1995).

Gabbe et al, "Towards Intelligent Recognition of Multimedia Episodes in Real-Time Applications," Proceedings of ACM Multimedia, 1994, pp. 227-236.

Hauptmann et al, "Story Segmentation and Detection of Commercials in Broadcast News Video," ADL-98 Advances in Digital Libraries, Santa Barbara, CA, Apr. 22-24, 1998.

Kemp et al, "Strategies for Automatic Segmentation of Audio Data," in Proc.ICASSP, Istanbul, Turkey, 2000, pp. III: 1423-1426.

Groner, "The telephone—the ultimate terminal", Telphony, pp. 34-40, Jun. 1984.

Arita et al., "The Voice Browser—an Archetype-Based Dialog Model", NEC Res & Develop., vol. 36 No. 4. pp. 554-561, Oct. 1995.

Hemphill et al., "Surfing the Web by Voice", ACM 0-89791-751-0-95/11 pp. 215-222, Nov. 1995.

WebSpeak Browser Guides Blind on to Internet. The Sunday Times, Feb. 25, 1996, [retrieved on 1997-04-97]. Retrieved from the Internet <URL: http://www.prodworks.com/st960225.htm>.*.

Aguilar, R. Visually Impaired Get Talking Browser. News.com[online], Feb. 12, 1996, [retrieved on Feb. 12, 1997} . Retrieved from the Internet <URL:http://www.news.com/News/Item/0,4,642,00.htm>.*.

Dunlap, C. AT&T: Internet can talk, too. Computer Reseller News, Nov. 11, 1994, Iss. 607; p. 12 [retrieved on 200-07-06]. REtrieved from the Internet <URL:http://proquest.umi.com/-22 .*.

Davis P: "Examining Microsoft's Speech SDK", Dr. Dobb's Journal, Jul. 1999, Miller Freeman, USA, vol. 24, No. 7, pp. 86, 88-90, XP008005211, ISSN: 1044-789X.

International Search Report, dated Aug. 13, 2002, for Patent Application No. PCT/US2002/014994, 2 pages.

Andrew G. Smolenski et al., U.S. Appl. No. 09/855,004, filed May 14, 2001, entitled, "Voice integration platform".

Andrew G. Smolenski et al., U.S. Appl. No. 09/858,281, filed May 15, 2001, entitled, "System and Method for Generating a Specific Voice User Interface".

Reeves, B. and Nass, C., The Media Equation: How People Treat Computers, Television, and New Media Like Real People and Places, pp. 89-108, ISBN No. 1-57586-052-X, CSLI Publications (1996).

* cited by examiner

DISTRIBUTED VOICE USER INTERFACE

CROSS-REFERENCE TO RELATED APPLICATIONS

This application is a divisional of Ser. No. 09/290,508, filed on Apr. 12, 1999, now U.S. Pat. No. 6,408,272, issued Jun. 18, 2002, entitled "Distributed Voice User Interface." This application relates to the subject matter disclosed in the following U.S. applications: U.S. patent application Ser. No. 10/056,471, filed concurrently herewith, entitled "Distributed Voice User Interface;" U.S. patent application Ser. No. 08/609,699, filed Mar. 1, 1996, entitled "Method and Apparatus for Telephonically Accessing and Navigating the Internet," now U.S. Pat. No. 5,953,392, issued Sep. 14, 1999; and U.S. patent application Ser. No. 09/971,717, filed May 1, 1998, entitled "Voice User Interface with Personality," now U.S. Pat. No. 6,144,938, issued Nov. 7, 2000. The applications for Ser. Nos. 08/609,699, and 09/071,717 were co-pending at the time of filing of U.S. patent application Ser. No. 09/290,508, filed Dec. 21, 1998, from which this application is a divisional. All of these applications are assigned to the present Assignee and are incorporated herein by this reference in their entirety.

TECHNICAL FIELD OF THE INVENTION

The present invention relates generally to user interfaces and, more particularly, to a distributed voice user interface.

CROSS-REFERENCE TO MICROFICHE APPENDICES

A portion of the disclosure of this patent document contains material that is subject to copyright protection. The copyright owner has no objection to the facsimile reproduction by anyone of the patent disclosure as it appears in the Patent and Trademark Office patent files or records, but otherwise reserves all copyright rights whatsoever.

BACKGROUND OF THE INVENTION

A voice user interface (VUI) allows a human user to interact with an intelligent, electronic device (e.g., a computer) by merely "talking" to the device. The electronic device is thus able to receive, and respond to, directions, commands, instructions, or requests issued verbally by the human user. As such, a VUI facilitates the use of the device.

A typical VUI is implemented using various techniques which enable an electronic device to "understand" particular words or phrases spoken by the human user, and to output or "speak" the same or different words/phrases for prompting, or responding to, the user. The words or phrases understood and/or spoken by a device constitute its "vocabulary." In general, the number of words/phrases within a device's vocabulary is directly related to the computing power which supports its VUI. Thus, a device with more computing power can understand more words or phrases than a device with less computing power.

Many modern electronic devices, such as personal digital assistants (PDAs), radios, stereo systems, television sets, remote controls, household security systems, cable and satellite receivers, video game stations, automotive dashboard electronics, household appliances, and the like, have some computing power, but typically not enough to support a sophisticated VI with a large vocabulary—i.e., a VUI capable of understanding and/or speaking many words and phrases. Accordingly, it is generally pointless to attempt to implement a VUI on such devices as the speech recognition and speech output capabilities would be far too limited for practical use.

SUMMARY

The present invention provides a system and method for a distributed voice user interface (VUI) in which a remote system cooperates with one or more local devices to deliver a sophisticated voice user interface at the local devices. The remote system and the local devices may communicate via a suitable network, such as, for example, a telecommunications network or a local area network (LAN). In one embodiment, the distributed VUI is achieved by the local devices performing preliminary signal processing (e.g., speech parameter extraction and/or elementary speech recognition) and accessing more sophisticated speech recognition and/or speech output functionality implemented at the remote system only if and when necessary.

According to an embodiment of the present invention, a local device includes an input device which can receive speech input issued from a user. A processing component, coupled to the input device, extracts feature parameters (which can be frequency domain parameters and/or time domain parameters) from the speech input for processing at the local device or, alternatively, at a remote system.

According to another embodiment of the present invention, a distributed voice user interface system includes a local device which continuously monitors for speech input issued by a user, scans the speech input for one or more keywords, and initiates communication with a remote system when a keyword is detected. The remote system receives the speech input from the local device and can then recognize words therein.

According to yet another embodiment of the present invention, a local device includes an input device for receiving speech input issued from a user. Such speech input may specify a command or a request by the user. A processing component, coupled to the input device, is operable to perform preliminary processing of the speech input. The processing component determines whether the local device is by itself able to respond to the command or request specified in the speech input. If not, the processing component initiates communication with a remote system for further processing of the speech input.

According to still another embodiment of the present invention, a remote system includes a transceiver which receives speech input, such speech input previously issued by a user and preliminarily processed and forwarded by a local device. A processing component, coupled to the transceiver at the remote system, recognizes words in the speech input.

According to still yet another embodiment of the present invention, a method includes the following steps: continuously monitoring at a local device for speech input issued by a user; scanning the speech input at the local device for one or more keywords; initiating a connection between the local device and a remote system when a keyword is detected; and passing the speech input, or appropriate feature parameters extracted from the speech input, from the local device to the remote system for interpretation.

A technical advantage of the present invention includes providing functional control over various local devices (e.g., PDAs, radios, stereo systems, television sets, remote controls, household security systems, cable and satellite receivers, video game stations, automotive dashboard electronics, household appliances, etc.) using sophisticated speech recognition capability enabled primarily at a remote site. The speech recognition capability is delivered to each local device in the form of a distributed VUI. Thus, functional control of the local devices via speech recognition can be provided in a cost-effective manner.

Another technical advantage of the present invention includes providing the vast bulk of hardware and/or software for implementing a sophisticated voice user interface at a single remote system, while only requiring minor hardware/software implementations at each of a number of local devices. This substantially reduces the cost of deploying a sophisticated voice user interface at the various local devices, because the incremental cost for each local device is small. Furthermore, the sophisticated voice user interface is delivered to each local device without substantially increasing its size. In addition, the power required to operate each local device is minimal since most of the capability for the voice user interface resides in the remote system; this can be crucial for applications in which a local device is battery-powered. Furthermore, the single remote system can be more easily maintained and upgraded with new features or hardware, than can the individual local devices.

Yet another technical advantage of the present invention includes providing a transient, on-demand connection between each local device and the remote system—i.e., communication between a local device and the remote system is enabled only if the local device requires the assistance of the remote system. Accordingly, communication costs, such as, for example, long distance charges, are minimized. Furthermore, the remote system is capable of supporting a larger number of local devices if each such device is only connected on a transient basis.

Still another technical advantage of the present invention includes providing the capability for data to be downloaded from the remote system to each of the local devices, either automatically or in response to a user's request. Thus, the data already present in each local device can be updated, replaced, or supplemented as desired, for example, to modify the voice user interface capability (e.g., speech recognition/output) supported at the local device. In addition, data from news sources or databases can be downloaded (e.g., from the Internet) and made available to the local devices for output to users.

Other aspects and advantages of the present invention will become apparent from the following descriptions and accompanying drawings.

BRIEF DESCRIPTION OF THE DRAWINGS

For a more complete understanding of the present invention and for further features and advantages, reference is now made to the following description taken in conjunction with the accompanying drawings, in which.

DETAILED DESCRIPTION OF THE PREFERRED EMBODIMENTS

Figure 1:
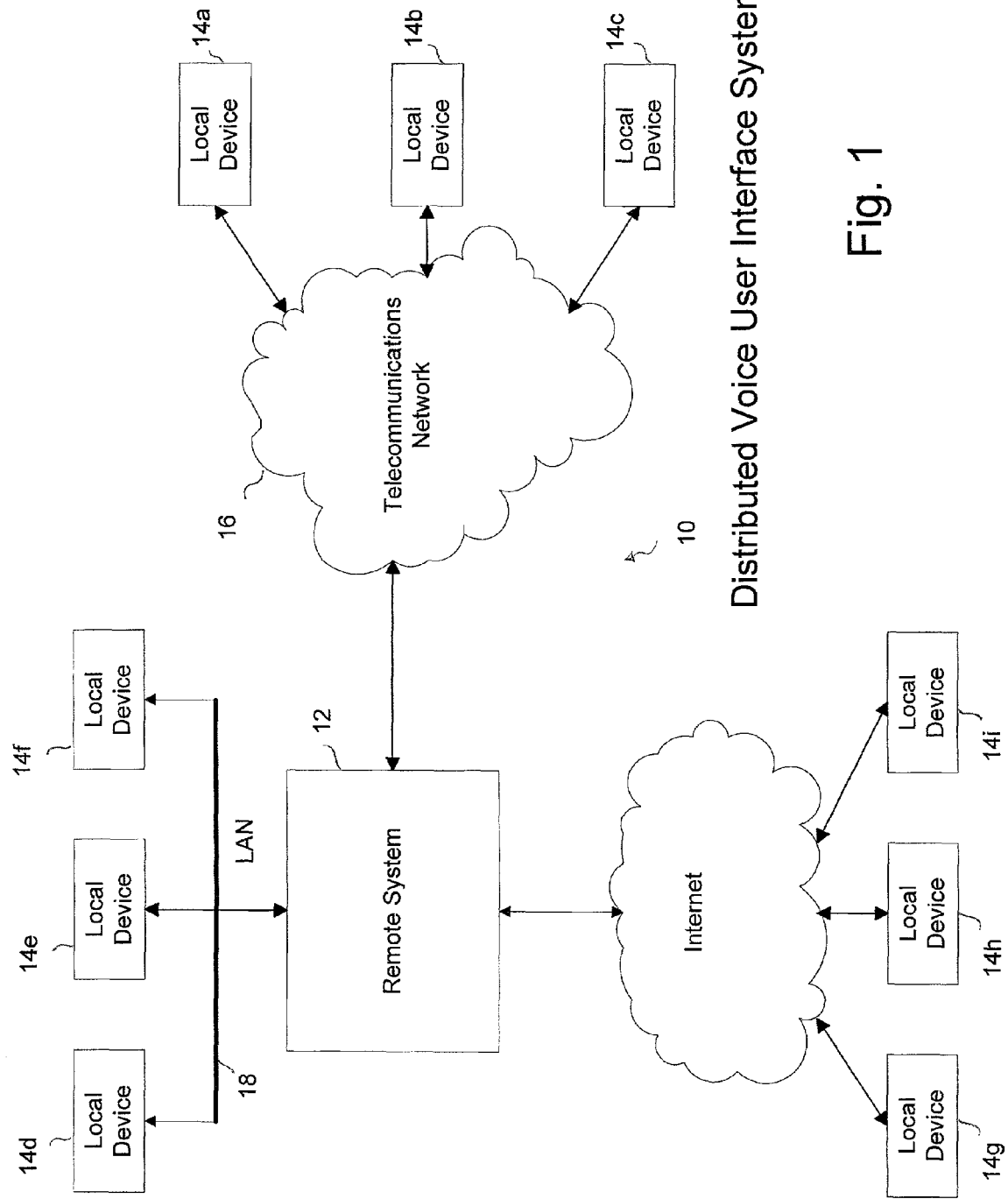
FIG. 1 illustrates a distributed voice user interface system, according to an embodiment of the present invention.

The preferred embodiments of the present invention and their advantages are best understood by referring to FIGS. 1 through 5 of the drawings. Like numerals are used for like and corresponding parts of the various drawings.

Turning first to the nomenclature of the specification, the detailed description which follows is represented largely in terms of processes and symbolic representations of operations performed by conventional computer components, such as a central processing unit (CPU) or processor associated with a general purpose computer system, memory storage devices for the processor, and connected pixel-oriented display devices. These operations include the manipulation of data bits by the processor and the maintenance of these bits within data structures resident in one or more of the memory storage devices. Such data structures impose a physical organization upon the collection of data bits stored within computer memory and represent specific electrical or magnetic elements. These symbolic representations are the means used by those skilled in the art of computer programming and computer construction to most effectively convey teachings and discoveries to others skilled in the art.

For purposes of this discussion, a process, method, routine, or sub-routine is generally considered to be a sequence of computer-executed steps leading to a desired result. These steps generally require manipulations of physical quantities. Usually, although not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, text, terms, numbers, records, files, or the like. It should be kept in mind, however, that these and some other terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, or the like, which are often associated with manual operations performed by a human operator. It must be understood that no involvement of the human operator may be necessary, or even desirable, in the present invention. The operations described herein are machine operations performed in conjunction with the human operator or user that interacts with the computer or computers.

In addition, it should be understood that the programs, processes, methods, and the like, described herein are but an exemplary implementation of the present invention and are not related, or limited, to any particular computer, apparatus, or computer language. Rather, various types of general purpose computing machines or devices may be used with programs constructed in accordance with the teachings described herein. Similarly, it may prove advantageous to construct a specialized apparatus to perform the method steps described herein by way of dedicated computer systems with hard-wired logic or programs stored in non-volatile memory, such as read-only memory (ROM).

Network System Overview

Referring now to the drawings, FIG. 1 illustrates a distributed voice user interface (VUI) system 10, according to an embodiment of the present invention. In general, distributed VUI system 10 allows one or more users to interact—via speech or verbal communication—with one or more electronic devices or systems into which distributed VUI system 10 is incorporated, or alternatively, to which distributed VUI system 10 is connected. As used herein, the terms "connected," "coupled," or any variant thereof, means any connection or coupling, either direct or indirect, between two or more elements; the coupling or connection can be physical or logical.

More particularly, distributed VUI system 10 includes a remote system 12 which may communicate with a number of local devices 14 (separately designated with reference numerals 14a, 14b, 14c, 14d, 14e, 14f, 14g, 14h, and 14i) to implement one or more distributed VUIs. In one embodiment, a "distributed VUI" comprises a voice user interface that may control the functioning of a respective local device 14 through the services and capabilities of remote system 12. That is, remote system 12 cooperates with each local device 14 to deliver a separate, sophisticated VUI capable of responding to a user and controlling that local device 14. In this way, the sophisticated VUIs provided at local devices 14 by distributed VUI system 10 facilitate the use of the local devices 14. In another embodiment, the distributed VUI enables control of another apparatus or system (e.g., a database or a website), in which case, the local device 14 serves as a "medium."

Each such VUI of system 10 may be "distributed" in the sense that speech recognition and speech output software and/or hardware can be implemented in remote system 12 and the corresponding functionality distributed to the respective local device 14. Some speech recognition/output software or hardware can be implemented in each of local devices 14 as well.

When implementing distributed VUI system 10 described herein, a number of factors may be considered in dividing the speech recognition/output functionality between local devices 14 and remote system 12. These factors may include, for example, the amount of processing and memory capability available at each of local devices 14 and remote system 12; the bandwidth of the link between each local device 14 and remote system 12; the kinds of commands, instructions, directions, or requests expected from a user, and the respective, expected frequency of each; the expected amount of use of a local device 14 by a given user; the desired cost for implementing each local device 14; etc. In one embodiment, each local device 14 may be customized to address the specific needs of a particular user, thus providing a technical advantage.

Local Devices

Each local device 14 can be an electronic device with a processor having a limited amount of processing or computing power. For example, a local device 14 can be a relatively small, portable, inexpensive, and/or low power-consuming "smart device," such as a personal digital assistant (PDA), a wireless remote control (e.g., for a television set or stereo system), a smart telephone (such as a cellular phone or a stationary phone with a screen), or smart jewelry (e.g., an electronic watch). A local device 14 may also comprise or be incorporated into a larger device or system, such as a television set, a television set top box (e.g., a cable receiver, a satellite receiver, or a video game station), a video cassette recorder, a video disc player, a radio, a stereo system, an automobile dashboard component, a microwave oven, a refrigerator, a household security system, a climate control system (for heating and cooling), or the like.

In one embodiment, a local device 14 uses elementary techniques (e.g., the push of a button) to detect the onset of speech. Local device 14 then performs preliminary processing on the speech waveform. For example, local device 14 may transform speech into a series of feature vectors or frequency domain parameters (which differ from the digitized or compressed speech used in vocoders or cellular phones). Specifically, from the speech waveform, the local device 14 may extract various feature parameters, such as, for example, cepstral coefficients, Fourier coefficients, linear predictive coding (LPC) coefficients, or other spectral parameters in the time or frequency domain. These spectral parameters (also referred to as features in automatic speech recognition systems), which would normally be extracted in the first stage of a speech recognition system, are transmitted to remote system 12 for processing therein. Speech recognition and/or speech output hardware/software at remote system 12 (in communication with the local device 14) then provides a sophisticated VUI through which a user can input commands, instructions, or directions into, and/or retrieve information or obtain responses from, the local device 14.

In another embodiment, in addition to performing preliminary signal processing (including feature parameter extraction), at least a portion of local devices 14 may each be provided with its own resident VUI. This resident VUI allows the respective local device 14 to understand and speak to a user, at least on an elementary level, without remote system 12. To accomplish this, each such resident VUI may include, or be coupled to, suitable input/output devices (e.g., microphone and speaker) for receiving and outputting audible speech. Furthermore, each resident VUI may include hardware and/or software for implementing speech recognition (e.g., automatic speech recognition (ASR) software) and speech output (e.g., recorded or generated speech output software). An exemplary embodiment for a resident VUI of a local device 14 is described below in more detail.

A local device 14 with a resident VUI may be, for example, a remote control for a television set. A user may issue a command to the local device 14 by stating "Channel four" or "Volume up," to which the local device 14 responds by changing the channel on the television set to channel four or by turning up the volume on the set.

Because each local device 14, by definition, has a processor with limited computing power, the respective resident VUI for a local device 14, taken alone, generally does not provide extensive speech recognition and/or speech output capability. For example, rather than implement a more complex and sophisticated natural language (NL) technique for speech recognition, each resident VUI may perform "word spotting" by scanning speech input for the occurrence of one or more "keywords." Furthermore, each local device 14 will have a relatively limited vocabulary (e.g., less than one hundred words) for its resident VUI. As such, a local device 14, by itself, is only capable of responding to relatively simple commands, instructions, directions, or requests from a user.

In instances where the speech recognition and/or speech output capability provided by a resident VUI of a local device 14 is not adequate to address the needs of a user, the resident VUI can be supplemented with the more extensive capability provided by remote system 12. Thus, the local device 14 can be controlled by spoken commands and otherwise actively participate in verbal exchanges with the user by utilizing more complex speech recognition/output hardware and/or software implemented at remote system 12 (as further described herein).

Each local device 14 may further comprise a manual input device—such as a button, a toggle switch, a keypad, or the like—by which a user can interact with the local device 14 (and also remote system 12 via a suitable communication network) to input commands, instructions, requests, or directions without using either the resident or distributed VUI. For example, each local device 14 may include hardware and/or software supporting the interpretation and issuance of dual tone multiple frequency (DTMF) commands In one embodiment, such manual input device can be used by the user to activate or turn on the respective local device 14 and/or initiate communication with remote system 12.

Remote System

In general, remote system 12 supports a relatively sophisticated VUI which can be utilized when the capabilities of any given local device 14 alone are insufficient to address or respond to instructions, commands, directions, or requests issued by a user at the local device 14. The VUI at remote system 12 can be implemented with speech recognition/output hardware and/or software suitable for performing the functionality described herein.

The VUI of remote system 12 interprets the vocalized expressions of a user—communicated from a local device 14—so that remote system 12 may itself respond, or alternatively, direct the local device 14 to respond, to the commands, directions, instructions, requests, and other input spoken by the user. As such, remote system 12 completes the task of recognizing words and phrases.

The VUI at remote system 12 can be implemented with a different type of automatic speech recognition (ASR) hardware/software than local devices 14. For example, in one embodiment, rather than performing "word spotting," as may occur at local devices 14, remote system 12 may use a larger vocabulary recognizer, implemented with word and optional sentence recognition grammars. A recognition grammar specifies a set of directions, commands, instructions, or requests that, when spoken by a user, can be understood by a VUI. In other words, a recognition grammar specifies what sentences and phrases are to be recognized by the VUI. For example, if a local device 14 comprises a microwave oven, a distributed VUI for the same can include a recognition grammar that allows a user to set a cooking time by saying, "Oven high for half a minute," or "Cook on high for thirty seconds," or, alternatively, "Please cook for thirty seconds at high." Commercially available speech recognition systems with recognition grammars are provided by ASR technology vendors such as, for example, the following: Nuance Corporation of Menlo Park, Calif.; Dragon Systems of Newton, Mass.; IBM of Austin, Tex.; Kurzweil Applied Intelligence of Waltham, Mass.; Lernout Hauspie Speech Products of Burlington, Mass.; and PureSpeech, Inc. of Cambridge, Mass.

Remote system 12 may process the directions, commands, instructions, or requests that it has recognized or understood from the utterances of a user. During processing, remote system 12 can, among other things, generate control signals and reply messages, which are returned to a local device 14. Control signals are used to direct or control the local device 14 in response to user input. For example, in response to a user command of "Turn up the heat to 82 degrees," control signals may direct a local device 14 incorporating a thermostat to adjust the temperature of a climate control system. Reply messages are intended for the immediate consumption of a user at the local device and may take the form of video or audio, or text to be displayed at the local device. As a reply message, the VUI at remote system 12 may issue audible output in the form of speech that is understandable by a user.

For issuing reply messages, the VUI of remote system 12 may include capability for speech generation (synthesized speech) and/or play-back (previously recorded speech). Speech generation capability can be implemented with text-to-speech (TTS) hardware/software, which converts textual information into synthesized, audible speech. Speech play-back capability may be implemented with an analog-to-digital (A/D) converter driven by CD ROM (or other digital memory device), a tape player, a laser disc player, a specialized integrated circuit (IC) device, or the like, which plays back previously recorded human speech.

In speech play-back, a person (preferably a voice model) recites various statements which may desirably be issued during an interactive session with a user at a local device 14 of distributed VUI system 10. The person's voice is recorded as the recitations are made. The recordings are separated into discrete messages, each message comprising one or more statements that would desirably be issued in a particular context (e.g., greeting, farewell, requesting instructions, receiving instructions, etc.). Afterwards, when a user interacts with distributed VUI system 10, the recorded messages are played back to the user when the proper context arises.

The reply messages generated by the VUI at remote system 12 can be made to be consistent with any messages provided by the resident VUI of a local device 14. For example, if speech play-back capability is used for generating speech, the same person's voice may be recorded for messages output by the resident VUI of the local device 14 and the VUI of remote system 12. If synthesized (computer-generated) speech capability is used, a similar sounding artificial voice may be provided for the VUIs of both local devices 14 and remote system 12. In this way, the distributed VUI of system 10 provides to a user an interactive interface which is "seamless" in the sense that the user cannot distinguish between the simpler, resident VUI of the local device 14 and the more sophisticated VUI of remote system 12.

In one embodiment, the speech recognition and speech play-back capabilities described herein can be used to implement a voice user interface with personality, as taught by U.S. patent application Ser. No. 09/071,717, entitled "Voice User Interface With Personality," the text of which is incorporated herein by reference.

Remote system 12 may also comprise hardware and/or software supporting the interpretation and issuance of commands, such as dual tone multiple frequency (DTMF) commands, so that a user may alternatively interact with remote system 12 using an alternative input device, such as a telephone key pad.

Remote system 12 may be in communication with the "Internet," thus providing access thereto for users at local devices 14. The Internet is an interconnection of computer "clients" and "servers" located throughout the world and exchanging information according to Transmission Control Protocol/Internet Protocol (TCP/IP), Internetwork Packet eXchange/Sequence Packet exchange (IPX/SPX), Apple-Talk, or other suitable protocol. The Internet supports the distributed application known as the "World Wide Web." Web servers may exchange information with one another using a protocol known as hypertext transport protocol (HTTP). Information may be communicated from one server to any other computer using HTTP and is maintained in the form of web pages, each of which can be identified by a respective uniform resource locator (URL). Remote system 12 may function as a client to interconnect with Web servers. The interconnection may use any of a variety of communication links, such as, for example, a local telephone communication line or a dedicated communication line. Remote system 12 may comprise and locally execute a "web browser" or "web proxy" program. A web browser is a computer program that allows remote system 12, acting as a client, to exchange information with the World Wide Web. Any of a variety of web browsers are available, such as NETSCAPE NAVIGATOR from Netscape Communications Corp. of Mountain View, Calif., INTERNET EXPLORER from Microsoft Corporation of Redmond, Wash., and others that allow users to conveniently access and navigate the Internet. A web proxy is a computer program which (via the Internet) can, for example, electronically integrate the systems of a company and its vendors and/or customers, support business transacted electronically over the network (i.e., "e-commerce"), and provide automated access to Web-enabled resources. Any number of web proxies are available, such as B2B INTEGRATION SERVER from webMethods of Fairfax, Va., and MICROSOFT PROXY SERVER from Microsoft Corporation of Redmond, Wash. The hardware, software, and protocols—as well as the underlying concepts and techniques—supporting the Internet are generally understood by those in the art.

Communication Network

One or more suitable communication networks enable local devices 14 to communicate with remote system 12. For example, as shown, local devices 14*a*, 14*b*, and 14*c* communicate with remote system 12 via telecommunications network 16; local devices 14*d*, 14*e*, and 14*f* communicate via local area network (LAN) 18; and local devices 14*g*, 14*h*, and 14*i* communicate via the Internet.

Telecommunications network 16 allows a user to interact with remote system 12 from a local device 14 via a telecommunications line, such as an analog telephone line, a digital T1 line, a digital T3 line, or an OC3 telephony feed. Telecommunications network 16 may include a public switched telephone network (PSTN) and/or a private system (e.g., cellular system) implemented with a number of switches, wire lines, fiber-optic cable, land-based transmission towers, space-based satellite transponders, etc. In one embodiment, telecommunications network 16 may include any other suitable communication system, such as a specialized mobile radio (SMR) system. As such, telecommunications network 16 may support a variety of communications, including, but not limited to, local telephony, toll (i.e., long distance), and wireless (e.g., analog cellular system, digital cellular system, Personal Communication System (PCS), Cellular Digital Packet Data (CDPD), ARDIS, RAM Mobile Data, Metricom Ricochet, paging, and Enhanced Specialized Mobile Radio (ESMR)). Telecommunications network 16 may utilize various calling protocols (e.g., Inband, Integrated Services Digital Network (ISDN) and Signaling System No. 7 (SS7) call protocols) and other suitable protocols (e.g., Enhanced Throughput Cellular (ETC), Enhanced Cellular Control ($EC^2$), MNP10, MNP10-EC, Throughput Accelerator (TX-CEL), Mobile Data Link Protocol, etc.). Transmissions over telecommunications network system 16 may be analog or digital. Transmission may also include one or more infrared links (e.g., IRDA).

In general, local area network (LAN) 18 connects a number of hardware devices in one or more of various configurations or topologies, which may include, for example, Ethernet, token ring, and star, and provides a path (e.g., bus) which allows the devices to communicate with each other. With local area network 18, multiple users are given access to a central resource. As depicted, users at local devices 14*d*, 14*e*, and 14*f* are given access to remote system 12 for provision of the distributed VUI.

For communication over the Internet, remote system 12 and/or local devices 14*g*, 14*h*, and 14*i* may be connected to, or incorporate, servers and clients communicating with each other using the protocols (e.g., TCP/IP or UDP), addresses (e.g., URL), links (e.g., dedicated line), and browsers (e.g., NETSCAPE NAVIGATOR) described above.

As an alternative, or in addition, to telecommunications network 16, local area network 18, or the Internet (as depicted in FIG. 1), distributed VUI system 10 may utilize one or more other suitable communication networks. Such other communication networks may comprise any suitable technologies for transmitting/receiving analog or digital signals. For example, such communication networks may comprise cable modems, satellite, radio, and/or infrared links.

The connection provided by any suitable communication network (e.g., telecommunications network 16, local area network 18, or the Internet) can be transient. That is, the communication network need not continuously support communication between local devices 14 and remote system 12, but rather, only provides data and signal transfer therebetween when a local device 14 requires assistance from remote system 12. Accordingly, operating costs (e.g., telephone facility charges) for distributed VUI system 10 can be substantially reduced or minimized.

Operation (In General)

In generalized operation, each local device 14 can receive input in the form of vocalized expressions (i.e., speech input) from a user and may perform preliminary or initial signal processing, such as, for example, feature extraction computations and elementary speech recognition computations. The local device 14 then determines whether it is capable of further responding to the speech input from the user. If not, local device 14 communicates—for example, over a suitable network, such as telecommunications network 16 or local area network (LAN) 18—with remote system 12. Remote system 12 performs its own processing, which may include more advanced speech recognition techniques and the accessing of other resources (e.g., data available on the Internet). Afterwards, remote system 12 returns a response to the local device 14. Such response can be in the form of one or more reply messages and/or control signals. The local device 14 delivers the messages to its user, and the control signals modify the operation of the local device 14.

Local Device (Details)

Figure 2:
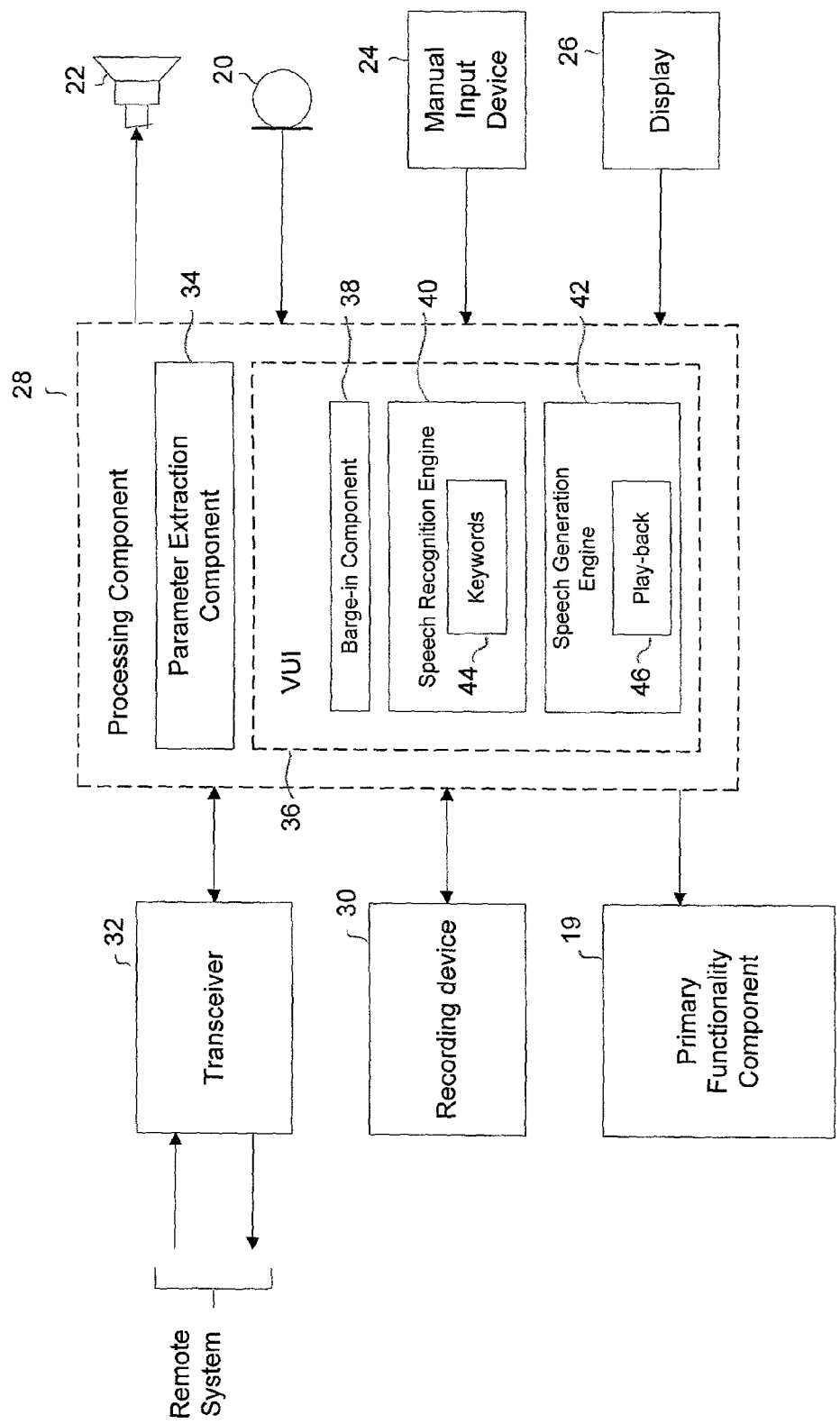
FIG. 2 illustrates details for a local device, according to an embodiment of the present invention.

FIG. 2 illustrates details for a local device 14, according to an embodiment of the present invention. As depicted, local device 14 comprises a primary functionality component 19, a microphone 20, a speaker 22, a manual input device 24, a display 26, a processing component 28, a recording device 30, and a transceiver 32.

Primary functionality component 19 performs the primary functions for which the respective local device 14 is provided. For example, if local device 14 comprises a personal digital assistant (PDA), primary functionality component 19 can maintain a personal organizer which stores information for names, addresses, telephone numbers, important dates, appointments, and the like. Similarly, if local device 14 comprises a stereo system, primary functionality component 19 can output audible sounds for a user's enjoyment by tuning into radio stations, playing tapes or compact discs, etc. If local device 14 comprises a microwave oven, primary functionality component 19 can cook foods. Primary functionality component 19 may be controlled by control signals which are generated by the remainder of local device 14, or remote system 12, in response to a user's commands, instructions, directions, or requests. Primary functionality component 19 is optional, and therefore, may not be present in every implementation of a local device 14; such a device could be one having a sole purpose of sending or transmitting information.

Microphone 20 detects the audible expressions issued by a user and relays the same to processing component 28 for processing within a parameter extraction component 34 and/or a resident voice user interface (VUI) 36 contained therein. Speaker 22 outputs audible messages or prompts which can originate from resident VUI 36 of local device 14, or alternatively, from the VUI at remote system 12. Speaker 22 is optional, and therefore, may not be present in every implementation; for example, a local device 14 can be implemented such that output to a user is via display 26 or primary functionality component 19.

Manual input device 24 comprises a device by which a user can manually input information into local device 14 for any of a variety of purposes. For example, manual input device 24 may comprise a keypad, button, switch, or the like, which a user can depress or move to activate/deactivate local device 14, control local device 14, initiate communication with remote system 12, input data to remote system 12, etc. Manual input device 24 is optional, and therefore, may not be present in every implementation; for example, a local device 14 can be implemented such that user input is via microphone 20 only. Display 26 comprises a device, such as, for example, a liquid-crystal display (LCD) or light-emitting diode (LED) screen, which displays data visually to a user. In some embodiments, display 26 may comprise an interface to another device, such as a television set. Display 26 is optional, and therefore, may not be present in every implementation; for example, a local device 14 can be implemented such that user output is via speaker 22 only.

Processing component 28 is connected to each of primary functionality component 19, microphone 20, speaker 22, manual input device 24, and display 26. In general, processing component 28 provides processing or computing capability in local device 14. In one embodiment, processing component 28 may comprise a microprocessor connected to (or incorporating) supporting memory to provide the functionality described herein. As previously discussed, such a processor has limited computing power.

Processing component 28 may output control signals to primary functionality component 19 for control thereof. Such control signals can be generated in response to commands, instructions, directions, or requests which are spoken by a user and interpreted or recognized by resident VUI 36 and/or remote system 12. For example, if local device 14 comprises a household security system, processing component 28 may output control signals for disarming the security system in response to a user's verbalized command of "Security off, code 4-2-5-6-7."

Parameter extraction component 34 may perform a number of preliminary signal processing operations on a speech waveform. Among other things, these operations transform speech into a series of feature parameters, such as standard cepstral coefficients, Fourier coefficients, linear predictive coding (LPC) coefficients, or other parameters in the frequency or time domain. For example, in one embodiment, parameter extraction component 34 may produce a twelve-dimensional vector of cepstral coefficients every ten milliseconds to model speech input data. Software for implementing parameter extraction component 34 is commercially available from line card manufacturers and ASR technology suppliers such as Dialogic Corporation of Parsippany, N.J., and Natural MicroSystems Inc. of Natick, Mass.

Resident VUI 36 may be implemented in processing component 28. In general, VUI 36 allows local device 14 to understand and speak to a user on at least an elementary level. As shown, VUI 36 of local device 14 may include a barge-in component 38, a speech recognition engine 40, and a speech generation engine 42.

Barge-in component 38 generally functions to detect speech from a user at microphone 20 and, in one embodiment, can distinguish human speech from ambient background noise. When speech is detected by barge-in component 38, processing component 28 ceases to emit any speech which it may currently be outputting so that processing component 28 can attend to the new speech input. Thus, a user is given the impression that he or she can interrupt the speech generated by local device 14 (and the distributed VUI system 10) simply by talking. Software for implementing barge-in component 38 is commercially available from line card manufacturers and ASR technology suppliers such as Dialogic Corporation of Parsippany, N.J., and Natural MicroSystems Inc. of Natick, Mass. Barge-in component 38 is optional, and therefore, may not be present in every implementation.

Speech recognition engine 40 can recognize speech at an elementary level, for example, by performing keyword searching. For this purpose, speech recognition engine 40 may comprise a keyword search component 44 which is able to identify and recognize a limited number (e.g., 100 or less) of keywords. Each keyword may be selected in advance based upon commands, instructions, directions, or requests which are expected to be issued by a user. In one embodiment, speech recognition engine 40 may comprise a logic state machine. Speech recognition engine 40 can be implemented with automatic speech recognition (ASR) software commercially available, for example, from the following companies: Nuance Corporation of Menlo Park, Calif.; Applied Language Technologies, Inc. of Boston, Mass.; Dragon Systems of Newton, Mass.; and PureSpeech, Inc. of Cambridge, Mass. Such commercially available software typically can be modified for particular applications, such as a computer telephony application. As such, the resident VUI 36 can be configured or modified by a user or another party to include a customized keyword grammar. In one embodiment, keywords for a grammar can be downloaded from remote system 12. In this way, keywords already existing in local device 14 can be replaced, supplemented, or updated as desired.

Speech generation engine 42 can output speech, for example, by playing back pre-recorded messages, to a user at appropriate times. For example, several recorded prompts and/or responses can be stored in the memory of processing component 28 and played back at any appropriate time. Such play-back capability can be implemented with a play-back component 46 comprising suitable hardware/software, which may include an integrated circuit device. In one embodiment, prerecorded messages (e.g., prompts and responses) may be downloaded from remote system 12. In this manner, the pre-recorded messages already existing in local device 14 can be replaced, supplemented, or updated as desired. Speech generation engine 42 is optional, and therefore, may not be present in every implementation; for example, a local device 14 can be implemented such that user output is via display 26 or primary functionality component 19 only.

Recording device 30, which is connected to processing component 28, functions to maintain a record of each interactive session with a user (i.e., interaction between distributed VUI system 10 and a user after activation, as described below). Such record may include the verbal utterances issued by a user during a session and preliminarily processed by parameter extraction component 34 and/or resident VUI 36. These recorded utterances are exemplary of the language used by a user and also the acoustic properties of the user's voice. The recorded utterances can be forwarded to remote system 12 for further processing and/or recognition. In a robust technique, the recorded utterances can be analyzed (for example, at remote system 12) and the keywords recognizable by distributed VUI system 10 updated or modified according to the user's word choices. The record maintained at recording device 30 may also specify details for the resources or components used in maintaining, supporting, or processing the interactive session. Such resources or components can include microphone 20, speaker 22, telecommunications network 16, local area network 18, connection charges (e.g., telecommunications charges), etc. Recording device 30 can be implemented with any suitable hardware/software. Recording device 30 is optional, and therefore, may not be present in some implementations.

Transceiver 32 is connected to processing component 28 and functions to provide bi-directional communication with remote system 12 over telecommunications network 16. Among other things, transceiver 32 may transfer speech and other data to and from local device 14. Such data may be coded, for example, using 32-KB Adaptive Differential Pulse Coded Modulation (ADPCM) or 64-KB MU-law parameters using commercially available modulation devices from, for example, Rockwell International of Newport Beach, Calif. In addition, or alternatively, speech data may be transfer coded as LPC parameters or other parameters achieving low bit rates (e.g., 4.8 Kbits/sec), or using a compressed format, such as, for example, with commercially available software from Voxware of Princeton, N.J. Data sent to remote system 12 can include frequency domain parameters extracted from speech by processing component 28. Data received from remote system 12 can include that supporting audio and/or video output at local device 14, and also control signals for controlling primary functionality component 19. The connection for transmitting data to remote system 12 can be the same or different from the connection for receiving data from remote system 12. In one embodiment, a "high bandwidth" connection is used to return data for supporting audio and/or video, whereas a "low bandwidth" connection may be used to return control signals.

In one embodiment, in addition to, or in lieu of, transceiver 32, local device 14 may comprise a local area network (LAN) connector and/or a wide area network (WAN) connector (neither of which are explicitly shown) for communicating with remote system 12 via local area network 18 or the Internet, respectively. The LAN connector can be implemented with any device which is suitable for the configuration or topology (e.g., Ethernet, token ring, or star) of local area network 18. The WAN connector can be implemented with any device (e.g., router) supporting an applicable protocol (e.g., TCP/IP, IPX/SPX, or AppleTalk).

Local device 14 may be activated upon the occurrence of any one or more activation or triggering events. For example, local device 14 may activate at a predetermined time (e.g., 7:00 a.m. each day), at the lapse of a predetermined interval (e.g., twenty-four hours), or upon triggering by a user at manual input device 24. Alternatively, resident VUI 36 of local device 14 may be constantly operating—listening to speech issued from a user, extracting feature parameters (e.g., cepstral, Fourier, or LPC) from the speech, and/or scanning for keyword "wake up" phrases.

After activation and during operation, when a user verbally issues commands, instructions, directions, or requests at microphone 20 or inputs the same at manual input device 24, local device 14 may respond by outputting control signals to primary functionality component 19 and/or outputting speech to the user at speaker 22. If local device 14 is able, it generates these control signals and/or speech by itself after processing the user's commands, instructions, directions, or requests, for example, within resident VUI 36. If local device 14 is not able to respond by itself (e.g., it cannot recognize a user's spoken command) or, alternatively, if a user triggers local device 14 with a "wake up" command, local device 14 initiates communication with remote system 12. Remote system 12 may then process the spoken commands, instructions, directions, or requests at its own VUI and return control signals or speech to local device 14 for forwarding to primary functionality component 19 or a user, respectively.

For example, local device 14 may, by itself, be able to recognize and respond to an instruction of "Dial number 555-1212," but may require the assistance of remote device 12 to respond to a request of "What is the weather like in Chicago?"

Remote System (Details)

Figure 3:
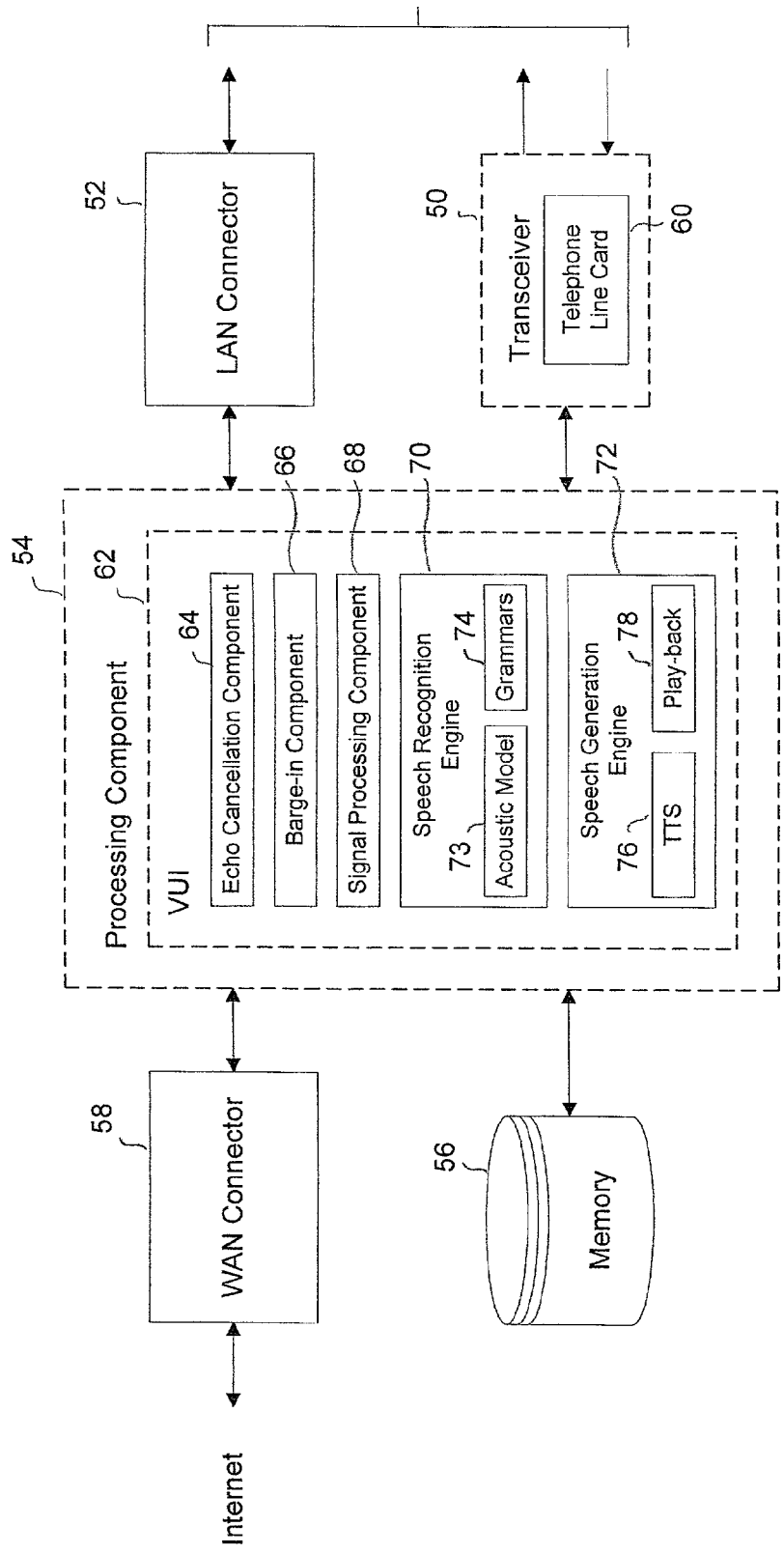
FIG. 3 illustrates details for a remote system, according to an embodiment of the present invention.

FIG. 3 illustrates details for a remote system 12, according to an embodiment of the present invention. Remote system 12 may cooperate with local devices 14 to provide a distributed VUI for communication with respective users and to generate control signals for controlling respective primary functionality components 19. As depicted, remote system 12 comprises a transceiver 50, a LAN connector 52, a processing component 54, a memory 56, and a WAN connector 58. Depending on the combination of local devices 14 supported by remote system 12, only one of the following may be required, with the other two optional: transceiver 50, LAN connector 52, or WAN connector 58.

Transceiver 50 provides bi-directional communication with one or more local devices 14 over telecommunications network 16. As shown, transceiver 50 may include a telephone line card 60 which allows remote system 12 to communicate with telephone lines, such as, for example, analog telephone lines, digital T1 lines, digital T3 lines, or OC3 telephony feeds. Telephone line card 60 can be implemented with various commercially available telephone line cards from, for example, Dialogic Corporation of Parsippany, N.J. (which supports twenty-four lines) or Natural MicroSystems Inc. of Natick, Mass. (which supports from two to forty-eight lines). Among other things, transceiver 50 may transfer speech data to and from local device 14. Speech data can be coded as, for example, 32-KB Adaptive Differential Pulse Coded Modulation (ADPCM) or 64-KB MU-law parameters using commercially available modulation devices from, for example, Rockwell International of Newport Beach, Calif. In addition, or alternatively, speech data may be transfer coded as LPC parameters or other parameters achieving low bit rates (e.g., 4.8 Kbits/sec), or using a compressed format, such as, for example, with commercially available software from Voxware of Princeton, N.J.

LAN connector 52 allows remote system 12 to communicate with one or more local devices over local area network 18. LAN connector 52 can be implemented with any device supporting the configuration or topology (e.g., Ethernet, token ring, or star) of local area network 18. LAN connector 52 can be implemented with a LAN card commercially available from, for example, 3COM Corporation of Santa Clara, Calif.

Processing component 54 is connected to transceiver 50 and LAN connector 52. In general, processing component 54 provides processing or computing capability in remote system 12. The functionality of processing component 54 can be performed by any suitable processor, such as a mainframe, a file server, a workstation, or other suitable data processing facility supported by memory (either internal or external) and running appropriate software. In one embodiment, processing component 54 can be implemented as a physically distributed or replicated system. Processing component 54 may operate under the control of any suitable operating system (OS), such as MS-DOS, MacINTOSH OS, WINDOWS NT, WINDOWS 95, OS/2, UNIX, LINUX, XENIX, and the like.

Processing component 54 may receive—from transceiver 50, LAN connector 52, and WAN connector 58—commands, instructions, directions, or requests, issued by one or more users at local devices 14. Processing component 54 processes these user commands, instructions, directions, or requests and, in response, may generate control signals or speech output.

For recognizing and outputting speech, a VUI 62 is implemented in processing component 54. This VUI 62 is more sophisticated than the resident VUIs 34 of local devices 14. For example, VUI 62 can have a more extensive vocabulary with respect to both the word/phrases which are recognized and those which are output. VUI 62 of remote system 12 can be made to be consistent with resident VUIs 34 of local devices 14. For example, the messages or prompts output by VUI 62 and VUIs 34 can be generated in the same synthesized, artificial voice. Thus, VUI 62 and VUIs 34 operate to deliver a "seamless" interactive interface to a user. In some embodiments, multiple instances of VUI 62 may be provided such that a different VUI is used based on the type of local device 14. As shown, VUI 62 of remote system 12 may include an echo cancellation component 64, a barge-in component 66, a signal processing component 68, a speech recognition engine 70, and a speech generation engine 72.

Echo cancellation component 64 removes echoes caused by delays (e.g., in telecommunications network 16) or reflections from acoustic waves in the immediate environment of a local device 14. This provides "higher quality" speech for recognition and processing by VUI 62. Software for implementing echo cancellation component 64 is commercially available from Noise Cancellation Technologies of Stamford, CN.

Barge-in component 66 may detect speech received at transceiver 50, LAN connector 52, or WAN connector 58. In one embodiment, barge-in component 66 may distinguish human speech from ambient background noise. When barge-in component 66 detects speech, any speech output by the distributed VUI is halted so that VUI 62 can attend to the new speech input. Software for implementing barge-in component 66 is commercially available from line card manufacturers and ASR technology suppliers such as, for example, Dialogic Corporation of Parsippany, N.J., and Natural MicroSystems Inc. of Natick, Mass. Barge-in component 66 is optional, and therefore, may not be present in every implementation.

Signal processing component 68 performs signal processing operations which, among other things, may include transforming speech data received in time domain format (such as ADPCM) into a series of feature parameters such as, for example, standard cepstral coefficients, Fourier coefficients, linear predictive coding (LPC) coefficients, or other parameters in the time or frequency domain. For example, in one embodiment, signal processing component 68 may produce a twelve-dimensional vector of cepstral coefficients every 10 milliseconds to model speech input data. Software for implementing signal processing component 68 is commercially available from line card manufacturers and ASR technology suppliers such as Dialogic Corporation of Parsippany, N.J., and Natural MicroSystems Inc. of Natick, Mass.

Speech recognition engine 70 allows remote system 12 to recognize vocalized speech. As shown, speech recognition engine 70 may comprise an acoustic model component 73 and a grammar component 74. Acoustic model component 73 may comprise one or more reference voice templates which store previous enunciations (or acoustic models) of certain words or phrases by particular users. Acoustic model component 73 recognizes the speech of the same users based upon their previous enunciations stored in the reference voice templates. Grammar component 74 may specify certain words, phrases, and/or sentences which are to be recognized if spoken by a user. Recognition grammars for grammar component 74 can be defined in a grammar definition language (GDL), and the recognition grammars specified in GDL can then be automatically translated into machine executable grammars. In one embodiment, grammar component 74 may also perform natural language (NL) processing. Hardware and/or software for implementing a recognition grammar is commercially available from such vendors as the following: Nuance Corporation of Menlo Park, Calif.; Dragon Systems of Newton, Mass.; IBM of Austin, Tex.; Kurzweil Applied Intelligence of Waltham, Mass.; Lernout Hauspie Speech Products of Burlington, Mass.; and PureSpeech, Inc. of Cambridge, Mass. Natural language processing techniques can be implemented with commercial software products separately available from, for example, UNISYS Corporation of Blue Bell, Pa. These commercially available hardware/software can typically be modified for particular applications.

Speech generation engine 72 allows remote system 12 to issue verbalized responses, prompts, or other messages, which are intended to be heard by a user at a local device 14. As depicted, speech generation engine 72 comprises a text-to-speech (TTS) component 76 and a play-back component 78. Text-to-speech component 76 synthesizes human speech by "speaking" text, such as that contained in a textual e-mail document. Text-to-speech component 76 may utilize one or more synthetic speech mark-up files for determining, or containing, the speech to be synthesized. Software for implementing text-to-speech component 76 is commercially available, for example, from the following companies: AcuVoice, Inc. of San Jose, Calif.; Centigram Communications Corporation of San Jose, Calif.; Digital Equipment Corporation (DEC) of Maynard, Mass.; Lucent Technologies of Murray Hill, N.J.; and Entropic Research Laboratory, Inc. of Washington, D.C. Play-back component 78 plays back pre-recorded messages to a user. For example, several thousand recorded prompts or responses can be stored in memory 56 of remote system 12 and played back at any appropriate time. Speech generation engine 72 is optional (including either or both of text-to-speech component 76 and playback component 78), and therefore, may not be present in every implementation.

Memory 56 is connected to processing component 54. Memory 56 may comprise any suitable storage medium or media, such as random access memory (RAM), read-only memory (ROM), disk, tape storage, or other suitable volatile and/or non-volatile data storage system. Memory 56 may comprise a relational database. Memory 56 receives, stores, and forwards information which is utilized within remote system 12 and, more generally, within distributed VUI system 10. For example, memory 56 may store the software code and data supporting the acoustic models, grammars, text-to-speech, and playback capabilities of speech recognition engine 70 and speech generation engine 72 within VUI 64.

WAN connector 58 is coupled to processing component 54. WAN connector 58 enables remote system 12 to communicate with the Internet using, for example, Transmission Control Protocol/Internet Protocol (TCP/IP), Internetwork Packet eXchange/Sequence Packet exchange (IPX/SPX), AppleTalk, or any other suitable protocol. By supporting communication with the Internet, WAN connector 58 allows remote system 12 to access various remote databases containing a wealth of information (e.g., stock quotes, telephone listings, directions, news reports, weather and travel information, etc.) which can be retrieved/downloaded and ultimately relayed to a user at a local device 14. WAN connector 58 can be implemented with any suitable device or combination of devices—such as, for example, one or more routers and/or switches—operating in conjunction with suitable software.

In one embodiment, WAN connector 58 supports communication between remote system 12 and one or more local devices 14 over the Internet.

Operation at Local Device

Figure 4:
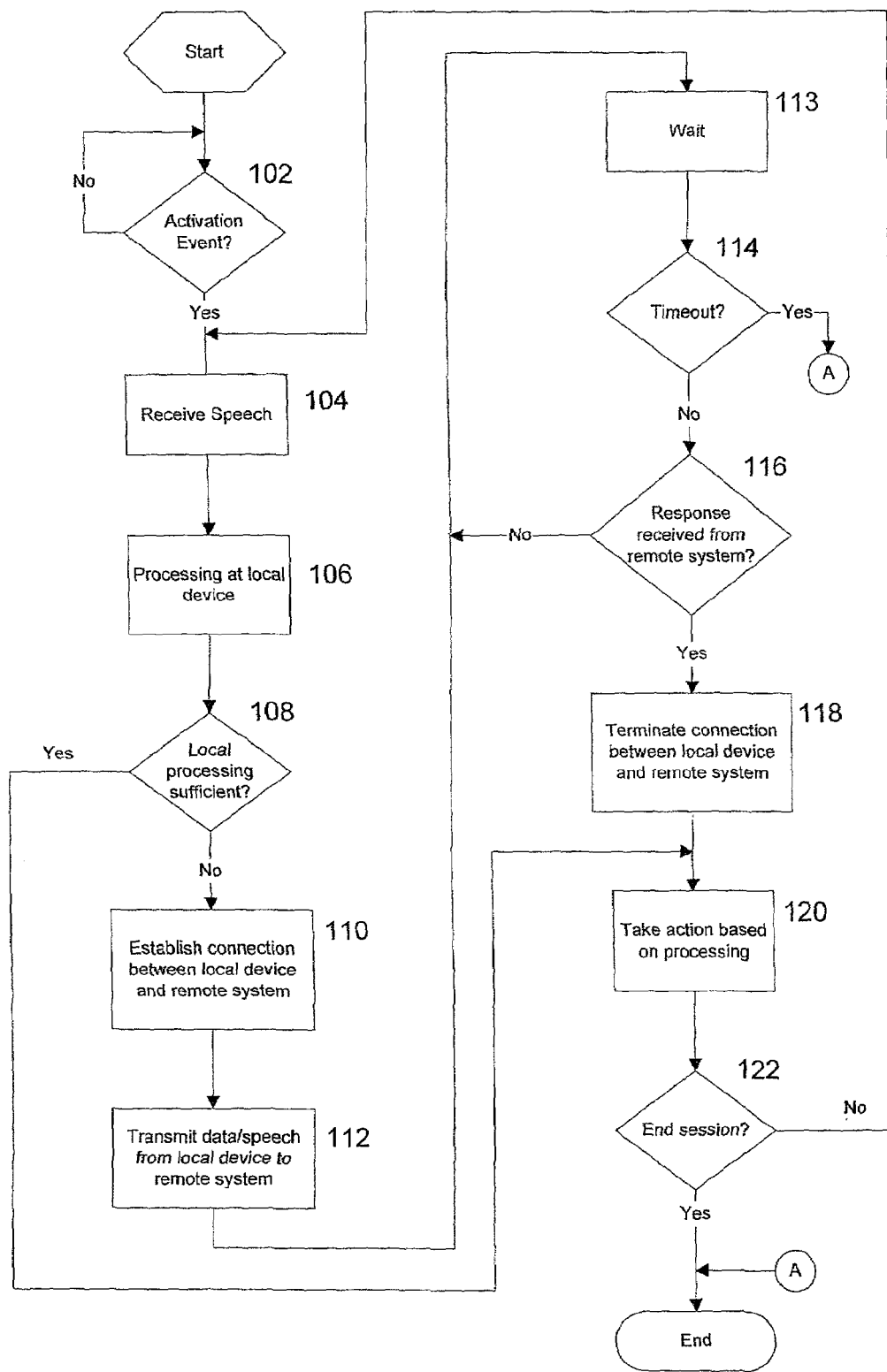
FIG. 4 is a flow diagram of an exemplary method of operation for a local device, according to an embodiment of the present invention.

FIG. 4 is a flow diagram of an exemplary method 100 of operation for a local device 14, according to an embodiment of the present invention.

Method 100 begins at step 102 where local device 14 waits for some activation event, or particular speech issued from a user, which initiates an interactive user session, thereby activating processing within local device 14. Such activation event may comprise the lapse of a predetermined interval (e.g., twenty-four hours) or triggering by a user at manual input device 24, or may coincide with a predetermined time (e.g., 7:00 a.m. each day). In another embodiment, the activation event can be speech from a user. Such speech may comprise one or more commands in the form of keywords—e.g., "Start," "Turn on," or simply "On"—which are recognizable by resident VUI 36 of local device 14. If nothing has occurred to activate or start processing within local device 14, method 100 repeats step 102. When an activating event does occur, and hence, processing is initiated within local device 14, method 100 moves to step 104.

At step 104, local device 14 receives speech input from a user at microphone 20. This speech input—which may comprise audible expressions of commands, instructions, directions, or requests spoken by the user—is forwarded to processing component 28. At step 106 processing component 28 processes the speech input. Such processing may comprise preliminary signal processing, which can include parameter extraction and/or speech recognition. For parameter extraction, parameter extraction component 34 transforms the speech input into a series of feature parameters, such as standard cepstral coefficients, Fourier coefficients, LPC coefficients, or other parameters in the time or frequency domain. For speech recognition, resident VUI 36 distinguishes speech using barge-in component 38, and may recognize speech at an elementary level (e.g., by performing key-word searching), using speech recognition engine 40.

As speech input is processed, processing component 28 may generate one or more responses. Such response can be a verbalized response which is generated by speech generation engine 42 and output to a user at speaker 22. Alternatively, the response can be in the form of one or more control signals, which are output from processing component 28 to primary functionality component 19 for control thereof. Steps 104 and 106 may be repeated multiple times for various speech input received from a user.

At step 108, processing component 28 determines whether processing of speech input locally at local device 14 is sufficient to address the commands, instructions, directions, or requests from a user. If so, method 100 proceeds to step 120 where local device 14 takes action based on the processing, for example, by replying to a user and/or controlling primary functionality component 19. Otherwise, if local processing is not sufficient, then at step 110, local device 14 establishes a connection between itself and remote device 12, for example, via telecommunications network 16 or local area network 18.

At step 112, local device 14 transmits data and/or speech input to remote system 12 for processing therein. Local device 14 at step 113 then waits, for a predetermined period, for a reply or response from remote system 12. At step 114, local device 14 determines whether a time-out has occurred—i.e., whether remote system 12 has failed to reply within a predetermined amount of time allotted for response. A response from remote system 12 may comprise data for producing an audio and/or video output to a user, and/or control signals for controlling local device 14 (especially, primary functionality component 19).

If it is determined at step 114 that remote system 12 has not replied within the time-out period, local device 14 may terminate processing, and method 100 ends. Otherwise, if a time-out has not yet occurred, then at step 116 processing component 28 determines whether a response has been received from remote system 12. If no response has yet been received from remote system 12, method 100 returns to step 113 where local device 14 continues to wait. Local device 14 repeats steps 113, 114, and 116 until either the time-out period has lapsed or, alternatively, a response has been received from remote system 12.

After a response has been received from remote system 12, then at step 118 local device 14 may terminate the connection between itself and remote device 12. In one embodiment, if the connection comprises a toll-bearing public switched telephone network (PSTN) connection, termination can be automatic (e.g., after the lapse of a time-out period). In another embodiment, termination is user-activated; for example, the user may enter a predetermined series of dual tone multiple frequency (DTMF) signals at manual input device 24.

At step 120, local device 14 takes action based upon the response from remote system 12. This may include outputting a reply message (audible or visible) to the user and/or controlling the operation of primary functionality component 19.

At step 122, local device 14 determines whether this interactive session with a user should be ended. For example, in one embodiment, a user may indicate his or her desire to end the session by ceasing to interact with local device 14 for a predetermined (time-out) period, or by entering a predetermined series of dual tone multiple frequency (DTMF) signals at manual input device 24. If it is determined at step 122 that the interactive session should not be ended, then method 100 returns to step 104 where local device 14 receives speech from a user. Otherwise, if it is determined that the session should be ended, method 100 ends.

Operation at Remote System

Figure 5:
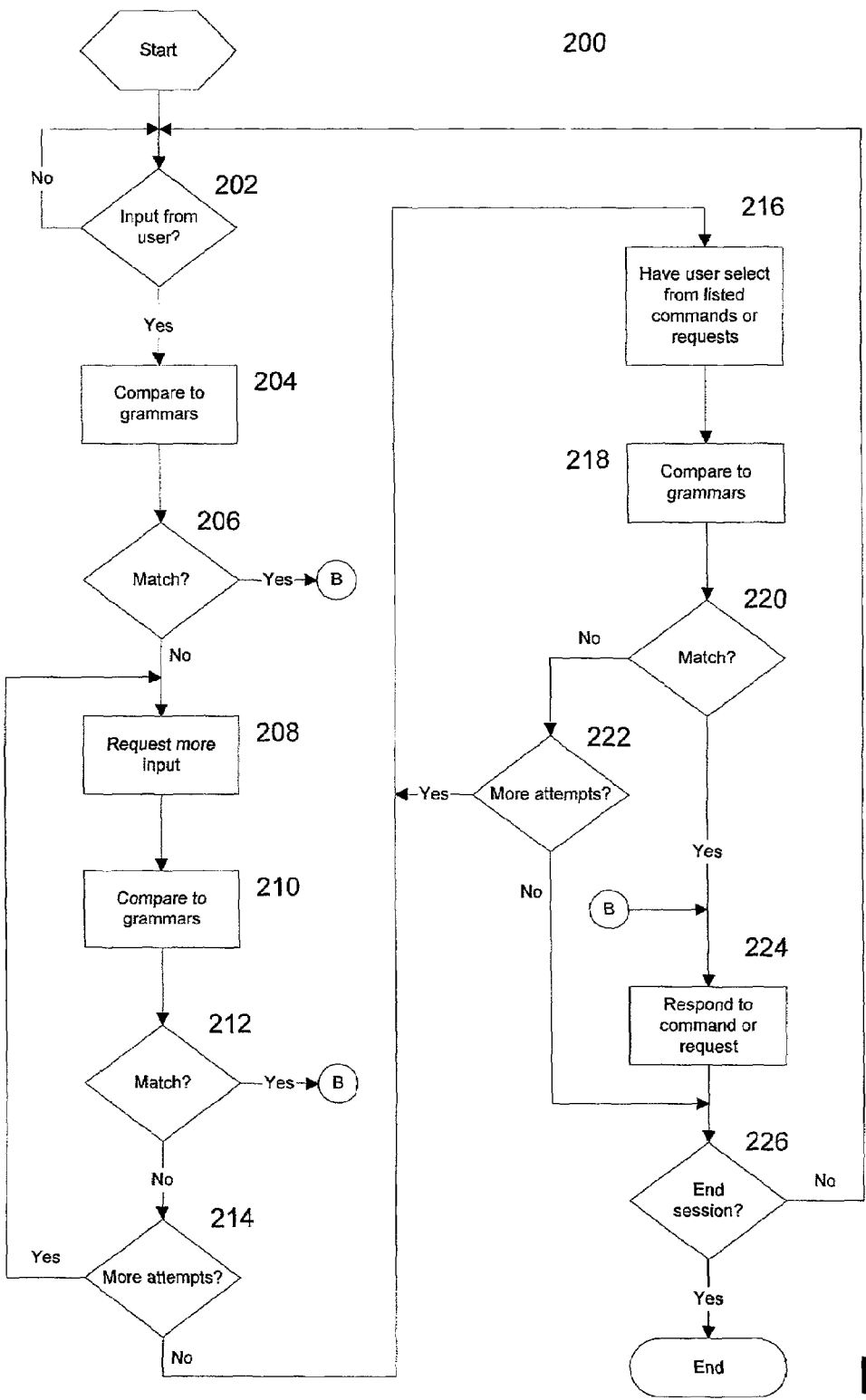
FIG. 5 is a flow diagram of an exemplary method of operation for a remote system, according to an embodiment of the present invention.

FIG. 5 is a flow diagram of an exemplary method 200 of operation for remote system 12, according to an embodiment of the present invention.

Method 200 begins at step 202 where remote system 12 awaits user input from a local device 14. Such input—which may be received at transceiver 50, LAN connector 52, or WAN connector 58—may specify a command, instruction, direction, or request from a user. The input can be in the form of data, such as a DTMF signal or speech. When remote system 12 has received an input, such input is forwarded to processing component 54.

Processing component 54 then processes or operates upon the received input. For example, assuming that the input is in the form of speech, echo cancellation component 64 of VUI 62 may remove echoes caused by transmission delays or reflections, and barge-in component 66 may detect the onset of human speech. Furthermore, at step 204, speech recognition engine 70 of VUI 62 compares the command, instruction, direction, or request specified in the input against grammars which are contained in grammar component 74. These grammars may specify certain words, phrases, and/or sentences which are to be recognized if spoken by a user. Alternatively, speech recognition engine 70 may compare the speech input against one or more acoustic models contained in acoustic model component 73.

At step 206, processing component 62 determines whether there is a match between the verbalized command, instruction, direction, or request spoken by a user and a grammar (or acoustic model) recognizable by speech recognition engine 70. If so, method 200 proceeds to step 224 where remote system 12 responds to the recognized command, instruction, direction, or request, as further described below. On the other hand, if it is determined at step 206 that there is no match (between a grammar (or acoustic model) and the user's spoken command, instruction, direction, or request), then at step 208 remote system 12 requests more input from a user. This can be accomplished, for example, by generating a spoken request in speech generation engine 72 (using either text-to-speech component 76 or play-back component 78) and then forwarding such request to local device 14 for output to the user.

When remote system 12 has received more spoken input from the user (at transceiver 50, LAN connector 52, or WAN connector 58), processing component 54 again processes the received input (for example, using echo cancellation component 64 and barge-in component 66). At step 210, speech recognition engine 70 compares the most recently received speech input against the grammars of grammar component 74 (or the acoustic models of acoustic model component 73).

At step 212, processing component 54 determines whether there is a match between the additional input and the grammars (or the acoustic models). If there is a match, method 200 proceeds to step 224. Alternatively, if there is no match, then at step 214 processing component 54 determines whether remote system 12 should again attempt to solicit speech input from the user. In one embodiment, a predetermined number of attempts may be provided for a user to input speech; a counter for keeping track of these attempts is reset each time method 200 performs step 202, where input speech is initially received. If it is determined that there are additional attempts left, then method 200 returns to step 208 where remote system 12 requests (via local device 14) more input from a user.

Otherwise, method 200 moves to step 216 where processing component 54 generates a message directing the user to select from a list of commands or requests which are recognizable by VUI 62. This message is forwarded to local device 14 for output to the user. For example, in one embodiment, the list of commands or requests is displayed to a user on display 26. Alternatively, the list can be spoken to the user via speaker 22.

In response to the message, the user may then select from the list by speaking one or more of the commands or requests. This speech input is then forwarded to remote system 12. At step 218, speech recognition engine 70 of VUI 62 compares the speech input against the grammars (or the acoustic models) contained therein.

At step 220, processing component 54 determines whether there is a match between the additional input and the grammars (or the acoustic models). If there is a match, method 200 proceeds to step 224. Otherwise, if there is no match, then at step 222 processing component 54 determines whether remote system 12 should again attempt to solicit speech input from the user by having the user select from the list of recognizable commands or requests. In one embodiment, a predetermined number of attempts may be provided for a user to input speech in this way; a counter for keeping track of these attempts is reset each time method 200 performs step 202, where input speech is initially received. If it is determined that there are additional attempts left, then method 200 returns to step 216 where remote system 12 (via local device 14) requests that the user select from the list. Alternatively, if it is determined that no attempts are left (and hence, remote system 12 has failed to receive any speech input that it can recognize), method 200 moves to step 226.

At step 224, remote system 12 responds to the command, instruction, direction or request from a user. Such response may include accessing the Internet via LAN connector 58 to retrieve requested data or information. Furthermore, such response may include generating one or more vocalized replies (for output to a user) or control signals (for directing or controlling local device 14).

At step 226, remote system 12 determines whether this session with local device 14 should be ended (for example, if a time-out period has lapsed). If not, method 200 returns to step 202 where remote system 12 waits for another command, instruction, direction, or request from a user. Otherwise, if it is determined at step 216 that there should be an end to this session, method 200 ends.

In an alternative operation, rather than passively waiting for user input from a local device 14 to initiate a session between remote system 12 and the local device, remote system 12 actively triggers such a session. For example, in one embodiment, remote system 12 may actively monitor stock prices on the Internet and initiate a session with a relevant local device 14 to inform a user when the price of a particular stock rises above, or falls below, a predetermined level.

Accordingly, as described herein, the present invention provides a system and method for a distributed voice user interface (VUI) in which remote system 12 cooperates with one or more local devices 14 to deliver a sophisticated voice user interface at each of local devices 14.

Although particular embodiments of the present invention have been shown and described, it will be obvious to those skilled in the art that changes and modifications may be made without departing from the present invention in its broader aspects, and therefore, the appended claims are to encompass within their scope all such changes and modifications that fall within the true scope of the present invention.

What is claimed is:

1. A system for providing a distributed voice interface to a device, comprising:
    a transceiver configured to receive input from the device via a communication network, wherein the input is the result of preliminary signal processing comprising keyword detection by the device prior to receipt of the input at the transceiver;
    a memory configured to store an acoustic model of the input; and
    a processing module coupled to the transceiver and configured to perform speech recognition on the received input based at least in part on a previously stored acoustic model in order to recognize a command,
    wherein the transceiver is further configured to transmit data to the device, responsive to the command, via the communication network using communication channels comprising:
        a high bandwidth communication channel configured to transmit data supporting audio or video output at the device, and
        a low bandwidth communication channel configured to transmit data supporting control signals for operation of a primary functionality component of the device, and
    wherein the data comprises audio data generated to be consistent with audio data generated by the device based on a type of the device.

2. The system of claim 1, wherein the data includes video data.

3. The system of claim 1, wherein the data includes audio data.

4. The system of claim 1, wherein the data include a text message.

5. The system of claim 1, wherein the input received from the device is not capable of being processed by the device.

6. The system of claim 1, wherein the processing module is further configured to retrieve remote data in response to the input received from the device.

7. The system of claim 1, the processing module further configured to:
- update or modify the keyword detection based at least in part on words within the input; and
- update the previously stored acoustic model based at least in part on the input.

8. A method for providing a distributed voice interface comprising:
- receiving an audio input comprising results from preliminary signal processing, the preliminary signal processing comprising keyword detection on a speech input;
- storing an acoustic model of the audio input;
- performing speech recognition on the received audio input, based at least in part on a previously stored acoustic model in order to recognize a command; and
- transmitting data to a device over a network, responsive to the command, using communication channels comprising:
  - a high bandwidth communication channel configured to transmit data supporting audio or video output at the device, and
  - a low bandwidth communication channel configured to transmit data supporting control signals for operation of a primary functionality component of the device,
- wherein the data comprises audio data generated to be consistent with audio data generated by the device based on a type of the device.

9. The method of claim 8, wherein the data includes video data.

10. The method of claim 8, wherein the data includes audio data.

11. The method of claim 8, wherein the data include a text message.

12. The method of claim 8, wherein the input received from the device is not capable of being processed by the device.

13. The method of claim 8, further comprising:
- retrieving remote data in response to the input received from the device.

14. The method of claim 8, further comprising:
- updating or modifying the keyword detection based at least in part on words within the audio input; and
- updating the previously stored acoustic model based at least in part on the audio input.

15. A computer-readable medium having computer program logic recorded thereon, execution of which, by a computing device, causes the computing device to perform operations comprising:
- receiving an audio input from a device via a communication network, the audio input based at least in part on speech input, wherein the audio input is the result of preliminary signal processing comprising keyword detection by the device prior to receipt of the audio input;
- performing speech recognition on the received audio input based at least in part on a previously stored acoustic model in order to recognize a command; and
- transmitting data to the device, responsive to the command, via the communication network using communication channels comprising:
  - a high bandwidth communication channel configured to transmit data supporting audio or video output at the device, and
  - a low bandwidth communication channel configured to transmit data supporting control signals for operation of a primary functionality component of the device,
- wherein the data comprises audio data generated to be consistent with audio data generated by the device based on a type of the device.

16. The computer program product of claim 15, wherein the data includes video data.

17. The computer program product of claim 15, wherein the data includes audio data.

18. The computer program product of claim 15, wherein the data include a text message.

19. The computer-readable medium of claim 15, wherein the input received from the device is not capable of being processed by the device.

20. The computer-readable medium of claim 15, further comprising:
- retrieving remote data in response to the input received from the device.

21. The computer-readable medium of claim 15, further comprising::
- updating or modifying the keyword detection based at least in part on words within the audio input; and
- updating the previously stored acoustic model based at least in part on the audio input.

22. A system for providing a distributed voice interface to a device, comprising:
- transceiver means for receiving input from the device via a communication network, wherein the input is the result of preliminary signal processing comprising keyword detection by the device prior to receipt of the input at the transceiver means;
- memory means for storing an acoustic model of the input; and
- processing means for performing speech recognition on the received input based at least in part on a previously stored acoustic model in order to recognize a command,
- wherein the transceiver means are further for transmitting data to the device, responsive to the command, via the communication network using communication channels comprising:
  - a high bandwidth communication channel configured to transmit data supporting audio or video output at the device, and
  - a low bandwidth communication channel configured to transmit data supporting control signals for operation of a primary functionality component of the device,
- wherein the data comprises audio data generated to be consistent with audio data generated by the device based on a type of the device.

23. The system of claim 22, the processing means further for:
- updating or modifying the keyword detection based at least in part on words within the input; and
- updating the previously stored acoustic model based at least in part on the input.

24. A system for providing a distributed voice interface to a device, comprising:
- a communication module configured to receive input from the device via a communication network, wherein the input is the result of preliminary signal processing comprising keyword detection by the device prior to receipt of the input at the communication module;

a memory module configured to store an acoustic model of the input; and a processing module coupled to the communication module and configured to perform speech recognition on the received input based at least in part on a previously stored acoustic model in order to recognize a command, wherein the communication module is further configured to transmit data to the device, responsive to the command, via the communication network using communication channels comprising:

a high bandwidth communication channel configured to transmit data supporting audio or video output at the device, and a low bandwidth communication channel configured to transmit data supporting control signals for operation of a primary functionality component of the device, wherein the data comprises audio data generated to be consistent with audio data generated by the device based on a type of the device.

25. The system of claim 24, the processing module further configured to:

update or modify the keyword detection based at least in part on words within the input; and update the previously stored acoustic model based at least in part on the input.

* * * * *

UNITED STATES PATENT AND TRADEMARK OFFICE
CERTIFICATE OF CORRECTION

| | | |
|---|---|---|
| PATENT NO. | : 8,078,469 B2 | Page 1 of 2 |
| APPLICATION NO. | : 10/057523 | |
| DATED | : December 13, 2011 | |
| INVENTOR(S) | : White et al. | |

It is certified that error appears in the above-identified patent and that said Letters Patent is hereby corrected as shown below:

On Page 2, in Item (56), under "U.S. PATENT DOCUMENTS", in Column 1, Line 34, delete "370/349" and insert -- 704/270.1 --, therefor.

On Page 2, in Item (56), under "OTHER PUBLICATIONS", in Column 2, Line 1, delete "entetprise_platform.shtrn1;" and insert -- enterprise_platform.shtml; --, therefor.

On Page 2, in Item (56), under "OTHER PUBLICATIONS", in Column 2, Line 11, delete ".cotn/" and insert -- .com/ --, therefor.

On Page 2, in Item (56), under "OTHER PUBLICATIONS", in Column 2, Line 15, delete "Obiects" and insert -- Objects --, therefor.

On Page 2, in Item (56), under "OTHER PUBLICATIONS", in Column 2, Line 46, delete ".htm<.*." and insert -- .htm>.*. --, therefor.

On Page 3, in Item (56), under "OTHER PUBLICATIONS", in Column 1, Line 28, delete "Telphony," and insert -- Telephony, --, therefor.

On Page 3, in Item (56), under "OTHER PUBLICATIONS", in Column 2, Line 13, delete "REtrieved" and insert -- Retrieved --, therefor.

On Page 3, in Item (56), under "OTHER PUBLICATIONS", in Column 2, Line 14, delete "-22 .*." and insert -- -22>.*. --, therefor.

IN THE SPECIFICATIONS:

In Column 1, Line 65, delete "VI" and insert -- VUI --, therefor.

In Column 6, Line 66, delete "commands" and insert -- commands. --, therefor.

Signed and Sealed this
Nineteenth Day of June, 2012

David J. Kappos
*Director of the United States Patent and Trademark Office*

CERTIFICATE OF CORRECTION (continued)
U.S. Pat. No. 8,078,469 B2

In Column 8, Line 44, delete "exchange (IPX/SPX)," and insert -- eXchange (IPX/SPX), --, therefor.

In Column 16, Line 57, delete "exchange (IPX/SPX)," and insert -- eXchange (IPX/SPX), --, therefor.

IN THE CLAIMS:

In Column 22, Line 10, in Claim 16, delete "computer program product" and insert -- computer-readable medium --, therefor.

In Column 22, Line 12, in Claim 17, delete "computer program product" and insert -- computer-readable medium --, therefor.

In Column 22, Line 14, in Claim 18, delete "computer program product" and insert -- computer-readable medium --, therefor.

In Column 22, Line 25, in Claim 21, delete "comprising::" and insert -- comprising: --, therefor.